United States Patent [19]

Agapiou

[11] Patent Number: 5,447,371
[45] Date of Patent: Sep. 5, 1995

[54] DRIVE UNIT FOR OPERATING A MACHINE FOR PRODUCING PASTE-LIKE AND/OR FLUID-LIKE FOOD PRODUCTS

[75] Inventor: Agis Agapiou, Limassol, Cyprus
[73] Assignee: Transtyle Limited, Limassol, Cyprus
[21] Appl. No.: 820,535
[22] Filed: Jan. 14, 1992
[30] Foreign Application Priority Data Jan. 18, 1991 [IT] Italy ............................... MI91A0108

[51] Int. Cl.⁶ ............................................... B01F 7/00
[52] U.S. Cl. ..................................... 366/290; 366/149;
366/314; 366/601; 74/664; 74/665 L
[58] Field of Search ................ 366/279, 290, 291, 292,
366/293, 297, 601, 91, 96, 97, 100, 144, 154,
149, 132, 205, 314; 74/664, 665 A, 665 C, 665
L, 665 M, 665 N, 665 Q, 665 P; 318/34, 49, 53,
66, 67, 112, 113, 111

[56] References Cited

U.S. PATENT DOCUMENTS

| | | |
|---|---|---|
| 2,324,395 | 7/1943 | Hoop . |
| 3,610,379 | 10/1971 | Courtenay ....................... 74/661 |
| 4,311,472 | 1/1982 | Hiersig et al. ..................... 74/665 L |
| 4,351,635 | 9/1882 | Staedeli ........................... 74/665 L |
| 4,653,928 | 3/1987 | Bravo ............................. 366/601 |
| 4,732,218 | 3/1988 | Neumaier et al. ................. 74/665 L |
| 4,745,773 | 5/1988 | Ando . |
| 4,823,630 | 4/1989 | Huggett ........................... 74/665 L |
| 4,828,326 | 5/1989 | Schupphaus et al. ................ 74/661 |

FOREIGN PATENT DOCUMENTS

| | | |
|---|---|---|
| 0140439 | 5/1985 | European Pat. Off. . |
| 293026 | 11/1988 | European Pat. Off. . |
| 423898 | 4/1991 | European Pat. Off. . |
| 1048168 | 12/1953 | France ............................ 74/665 L |
| 1480505 | 4/1967 | France . |
| 2357192 | 2/1978 | France . |
| 2542578 | 3/1984 | France . |
| 3009503 | 9/1981 | Germany ......................... 74/665 L |
| 996102 | 12/1975 | Italy . |

Primary Examiner—David A. Scherbel
Assistant Examiner—Tony G. Sooho
Attorney, Agent, or Firm—Hedman, Gibson & Costigan

[57] ABSTRACT

A machine is disclosed for producing paste like or fluid like food products. The machine has an upper container having heating or cooling means and a stirrer and a lower container having cooling means and a mixer. The stirrer and the mixer are operated by a drive unit which has two motors which are connected by shafts to the stirrer and the mixer through two separate reduction systems one of which has a free wheel which permits the operation of the stirrer and the mixer by one motor.

4 Claims, 8 Drawing Sheets

DRIVE UNIT FOR OPERATING A MACHINE FOR PRODUCING PASTE-LIKE AND/OR FLUID-LIKE FOOD PRODUCTS

This invention relates to a drive unit for operating a machine for producing paste-like and/or fluid-like food products, such as ice-cream or grated-ice drinks, various confectionary products such as miscellaneous creams or chocolate, and liquid and/or paste-like gastronomic products. The machine of the invention can be used for processes in ice-cream, confectionary or gastronomical production in which the product to be processed has to undergo heating and/or cooling.

The machine of the invention is of the type comprising two intercommunicating combined processing units, namely an upper vertical unit and a lower horizontal unit.

The upper unit consists of a container or vessel provided with heating and/or cooling means and within which a base mixture can be treated, for example pasteurized, and mixed by a bladed stirrer.

The lower unit consists of a cylinder of horizontal axis provided with cooling means, and within which the base mixture, either treated or not treated in the upper container, can be cooled and mixed by a suitable mixer.

The two units are operationally interconnected by a duct provided with a valve which controls the mixture flow from the upper container to the lower cylinder.

The various machine functions can be set by a programmable electronic control system.

A machine of this type is described for example in Italian patents 996,102 and 1,055,984, and in Italian patent application 22072 A/89 filed on 20 Oct. 1989.

Reference should be made to these patent documents if further clarification is required.

The overall object of the present invention is to provide a machine of the aforesaid type for producing paste-like and/or fluid-like food products comprising a drive unit which is operationally reliable, economical, easily accessible for maintenance, and positionable within a small space, to result in an extremely compact machine.

This object is attained according to the present invention by a drive unit for operating a machine for producing paste-like and/or fluid-like food products, of the type comprising two intercommunicating combined processing units, namely a vertically arranged upper unit and a horizontally arranged lower unit, the upper unit consisting of a container provided with heating and/or cooling means and a stirrer, and the lower unit consisting of a cylinder provided with cooling means and a mixer, characterised in that said drive unit comprises a first motor (32) and a second motor (33) which are operationally connected to said mixer (26) and said stirrer (21) via two respective reduction systems (34) and (42, 45), the reduction system (34) being provided with a motion input shaft (37) on which there is mounted a free wheel (35) which is operationally connected to the stirrer (21) and to the reduction system (42, 45), so that the stirrer (21) and the mixer (26) can be drive by their respective motors (32, 33) or by the motor (33) alone.

The structural and operational characteristics of the invention and its advantages compared with the known art will be more apparent from an examination of the description given hereinafter with reference to the accompanying drawings, which show two possible machine embodiments incorporating a drive unit constructed in accordance with the inventive principle. In the drawings.

Figure 1:
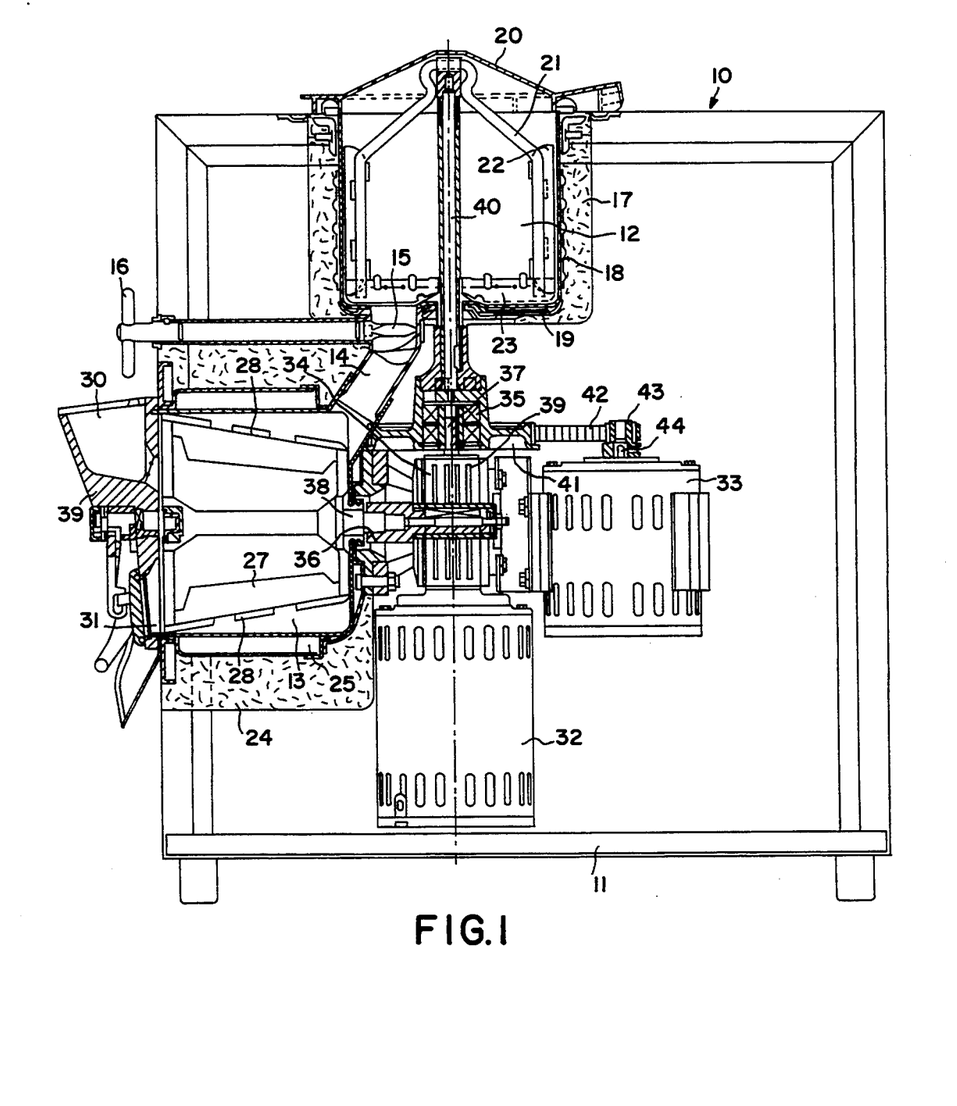
FIG. 1 is a vertical section showing a first embodiment of the invention'.
Figure 2:
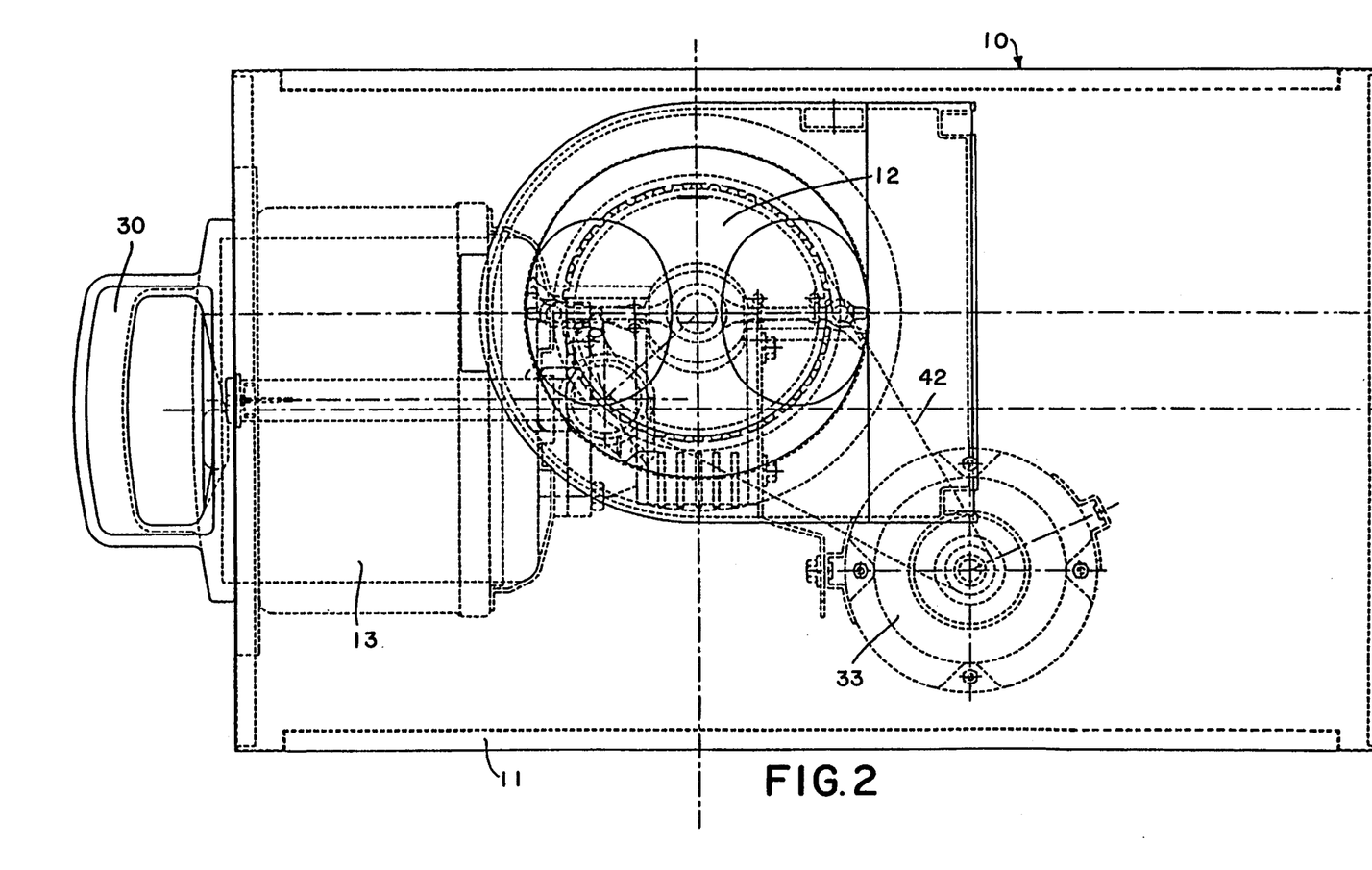
FIG. 2 is a plan view of the machine of FIG. 1.

With reference initially to FIGS. 1 and 2 of the drawings, the reference numeral 10 indicates a multi-purpose machine for producing paste-like and/or fluid-like food products, such as confectionary creams, chocolate, gastronomical products and ice-cream.

The machine 10 comprises a support structure 11 and consists of the combination of an upper container or vessel 12 of vertical axis, and a lower cylinder 13 of horizontal axis. The container 12 and cylinder 13 are interconnected by an internal duct 14 provided with a butterfly adjustment valve 15 operated manually by a handle 16 external to the machine.

The upper container 12 is externally insulated as at 17, and is provided with a heating and/or cooling system comprising an evaporator 18 on the shell, through which a refrigerant fluid circulates, and electrical resistance elements in sheet form 19 on the base and partly on the shell.

This briefly described heating system indicated schematically on the drawings forms the subject of U.S. Pat. No. 4,853,518 and U.S. Pat. No. 4,935,602.

The container 12, provided with a transparent cover 20, is fitted with a portal stirrer 21 comprising vertical blades 22 and horizontal blades 23 which sweep the shell and base respectively.

A stirrer of this type is described in U.S. Pat. No. 4,887,910. The horizontal cylinder 13 is insulated, as at 24, and is provided with a cooling system comprising an evaporator 25 through which a refrigerant fluid circulates, originating from the cooling system which produces cold for the container 12.

In the cylinder 13 there is mounted a mixer 26 comprising longitudinal blades 27 and radial teeth 28 which scrape the inner surface of the shell of the cylinder 13.

The cylinder 13 is closed frontally by a door 29 provided with a loading hopper 30 for introducing products, and with a delivery mouth 31. A door of this type is described for example in FIGS. 4, 5, 6, 7, 8 and 9.

According to the present invention the stirrer 21 and mixer 26 are operated by a drive unit consisting of the combination of a first motor 32, a second motor 33 and a system comprising a reduction gear 34 and a free wheel 35, this system being positioned between said motors 32, 33, the stirrer 21 and the mixer 26.

The reduction gear 34 can be for example that manufactured by Bonfiglioli S.p.A. of Bologna (Italy), model MVF 44/F (with a projecting worm).

The free wheel 35 can be for example that manufactured by Stieber Antriebselemente GmbH of Heidelberg (Germany), model KK20.

The reduction gear 34 is provided with two power outputs 36, 37 lying at 90° to and axial to the exit shaft of the motor 32 respectively.

The shaft 38 of the mixer 26 is connected to the power output 36, whereas the power output 37 receives the free wheel 35, the hub 39 of which is connected to the shaft 40 of the stirrer 21. With the hub 39 of the free wheel 35 there is rigid a toothed pulley 41 which is connected by a transmission belt 42 to a toothed wheel 43 fixed onto the exit shaft 44 of the second motor 33.

The operation of the aforedescribed drive unit is as follows.

The stirrer 21 of the upper container 12 and the mixer 26 of the lower cylinder 13 can be rotated simultaneously by operating the motor 33 alone.

In this case, the motor 33 transmits motion to the stirrer 21 via the hub 39 of the free wheel 35, and to the mixer 26 via the free wheel 35 itself and via both the power output shafts 37 and 36 of the reduction gear 34.

The stirrer 21 rotates at a relatively high speed, for example around 150 r.p.m., undergoing only a single reduction deriving from the belt transmission 42, whereas the mixer 26 rotates at a very slow speed, for example 24 r.p.m., undergoing a double reduction deriving from the linkage comprising the belt transmission 42 and the shaft 37 of the reduction gear 34, used as the motion input.

In this case the free wheel 35 is operative (engaged), and the motor 32, which is not operated, is dragged passively by the rotation of the shaft 37 of the reduction gear 34.

This method of machine operation is used for example for pasteurizing mixtures in the upper container, for cooking creams, for blending chocolate, and for cooking and cooling gastronomical products, whereas the lower cylinder 13 can be simultaneously used for cooling the previously pasteurized cream or for producing grated-ice drinks.

Figure 7:
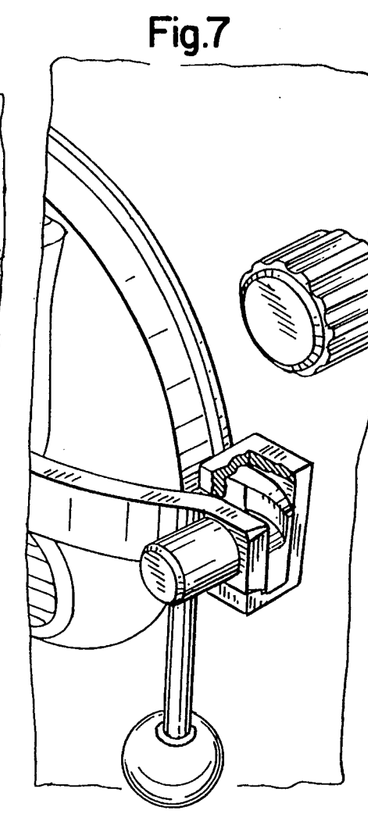
FIG. 7 is a perspective view of a latched door of FIG. 4 with the lock section in a cutaway view.
Figure 8:
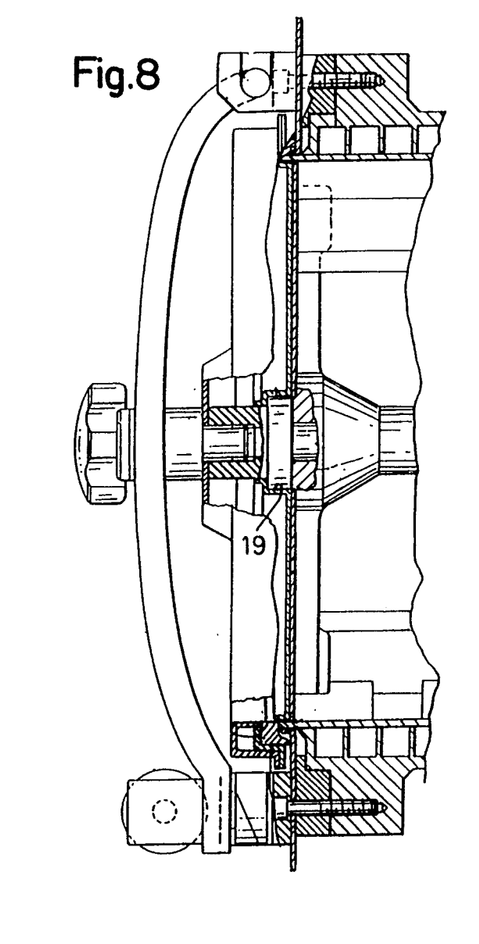
FIG. 8 is a side section of the door of FIG. 4.
Figure 9:
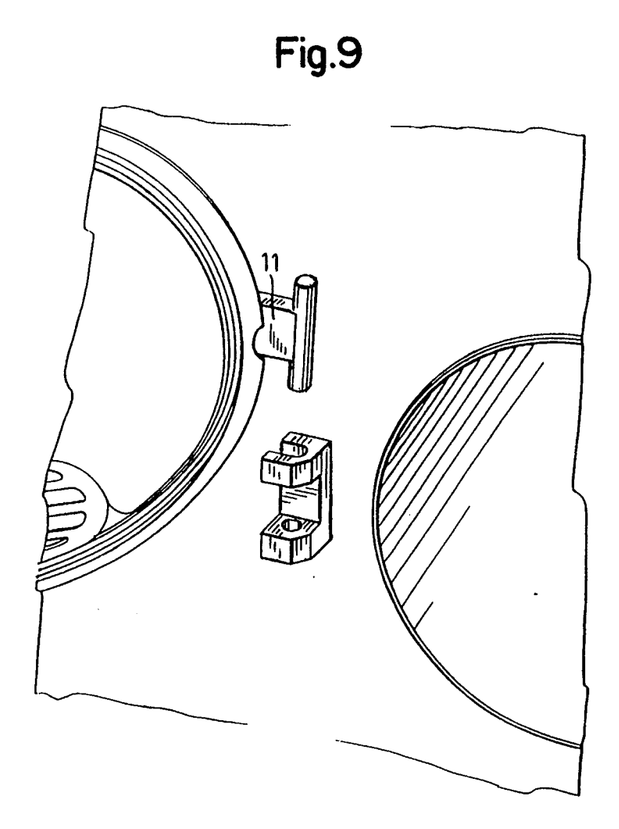
FIG. 9 is a detail view of the hinge of the door of FIG. 4.
Figure 10:
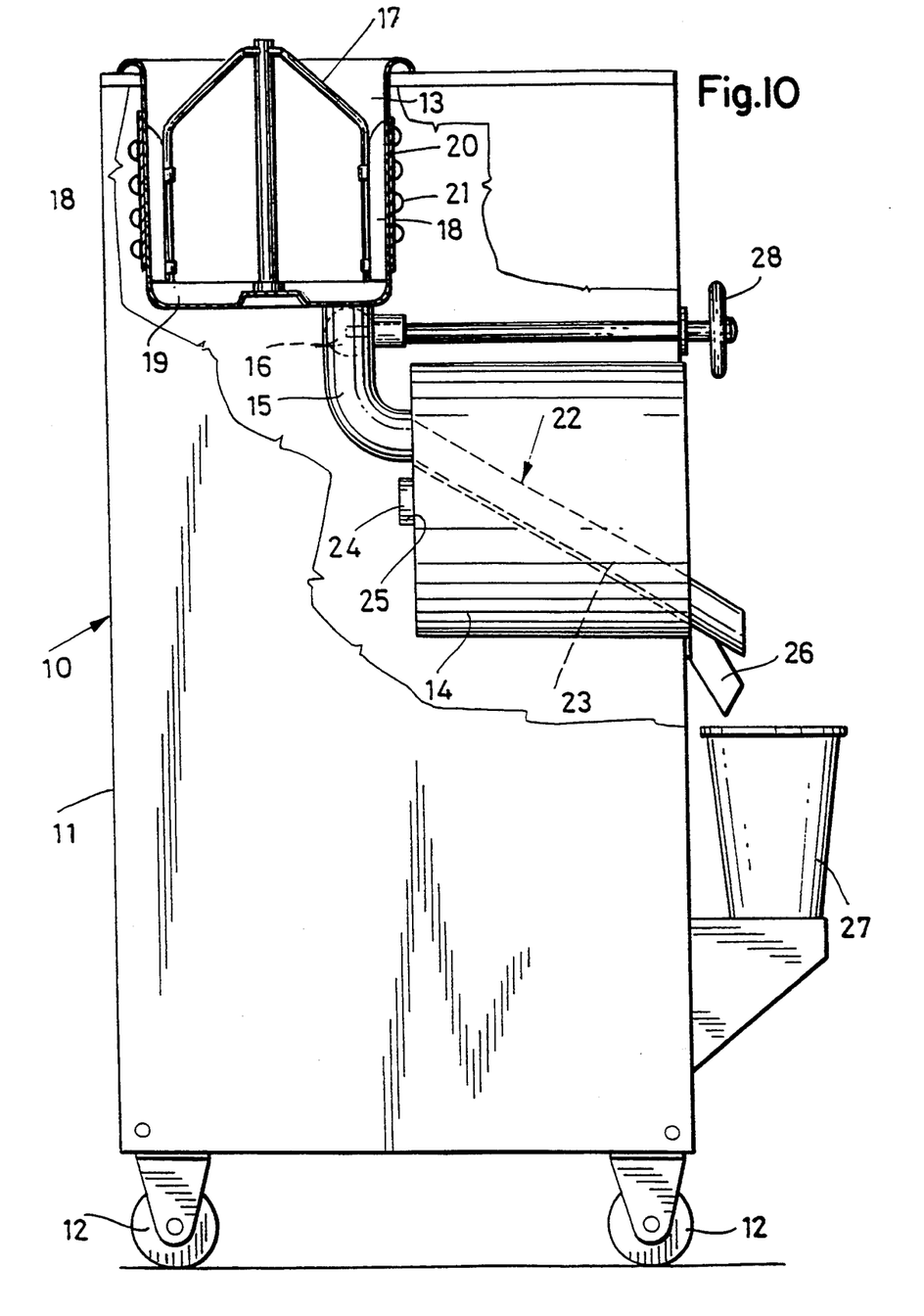
FIG. 10 is a side cutaway view of a means for withdrawal of product from the apparatus.
Figure 11:
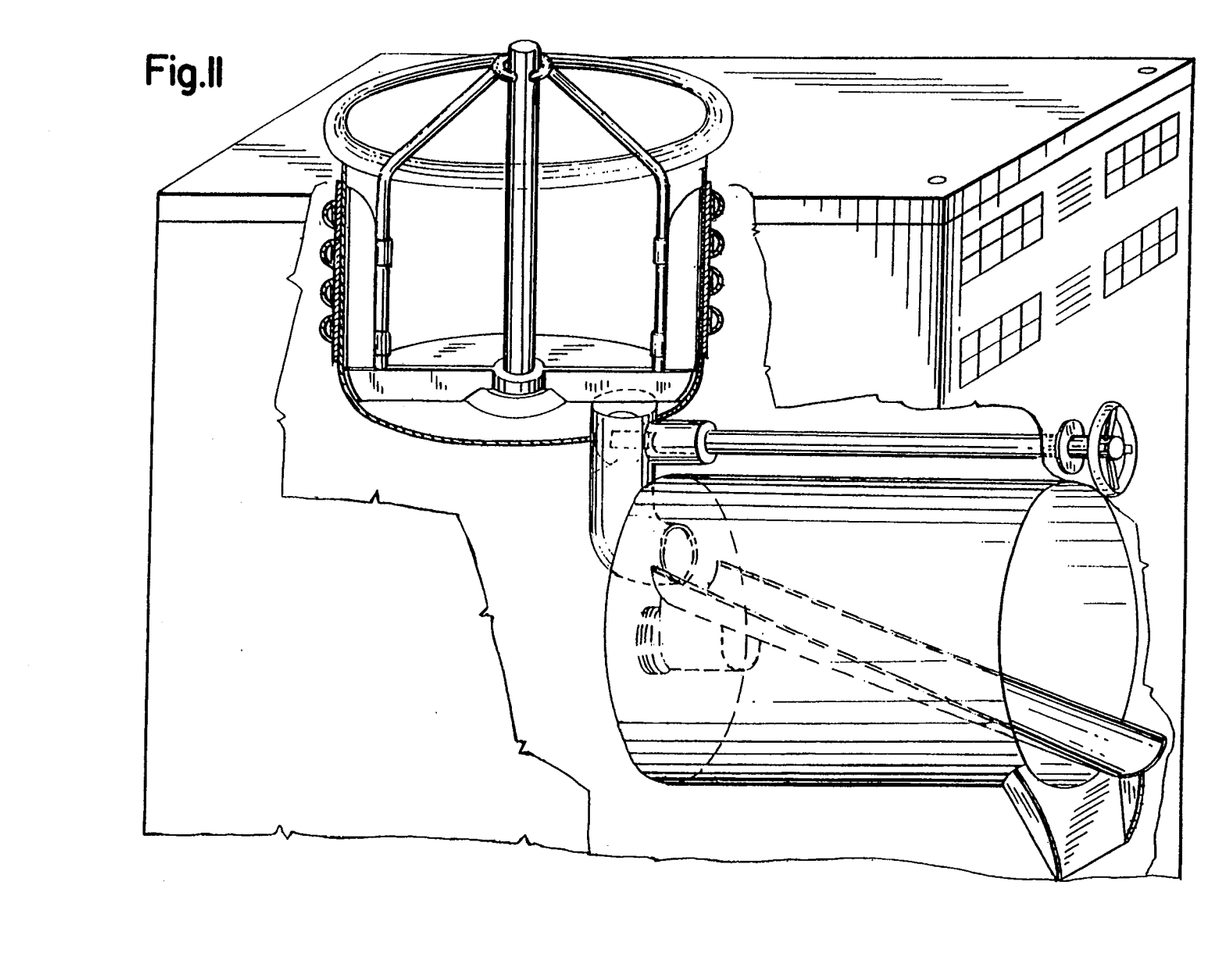
FIG. 11 is a perspective view of FIG. 10.

The blended chocolate can be withdrawn from the container 12 in the manner described in FIGS. 7-8.

The stirrer 21 and the mixer 26 can also be driven by operating the motors 33 and 32 respectively.

With this method of operation, the stirrer 21 rotates at the same relatively high speed of about 150 r.p.m. as in the preceding case, the upper container 12 being used for example for effecting a pasteurization cycle on a mixture for ice-cream production, the whisk 26 also rotating at a relatively high speed for example of about 200 r.p.m., being driven directly by the motor 32 via the 90° power output 36 of the reduction gear 34, hence undergoing only a single motion reduction, to whisk the mixture previously pasteurized in the upper container 12 and hence produce soft ice-cream.

In this case the free wheel 35 is inoperative (disengaged).

Figure 3:
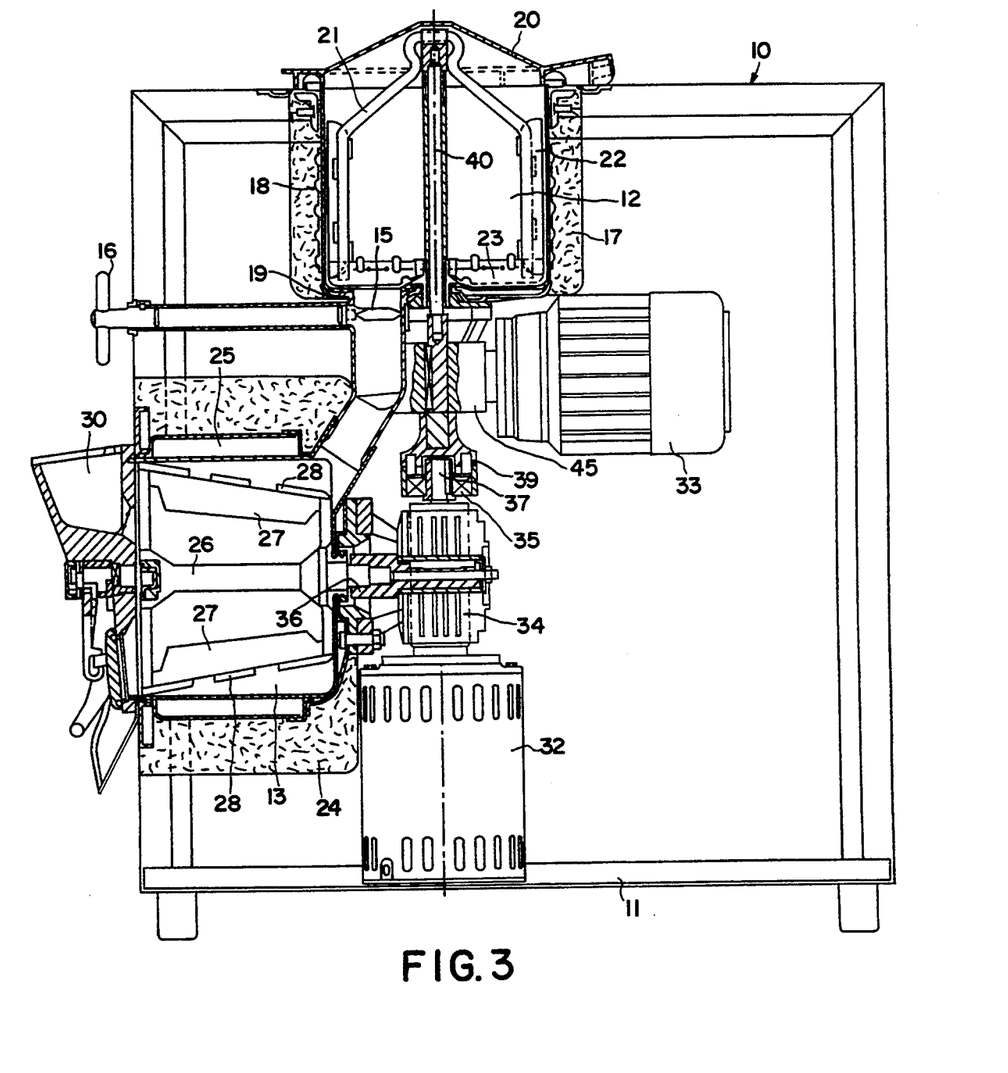
FIG. 3 is a vertical section, as in FIG. 1, showing a second embodiment of the invention.
Figure 4:
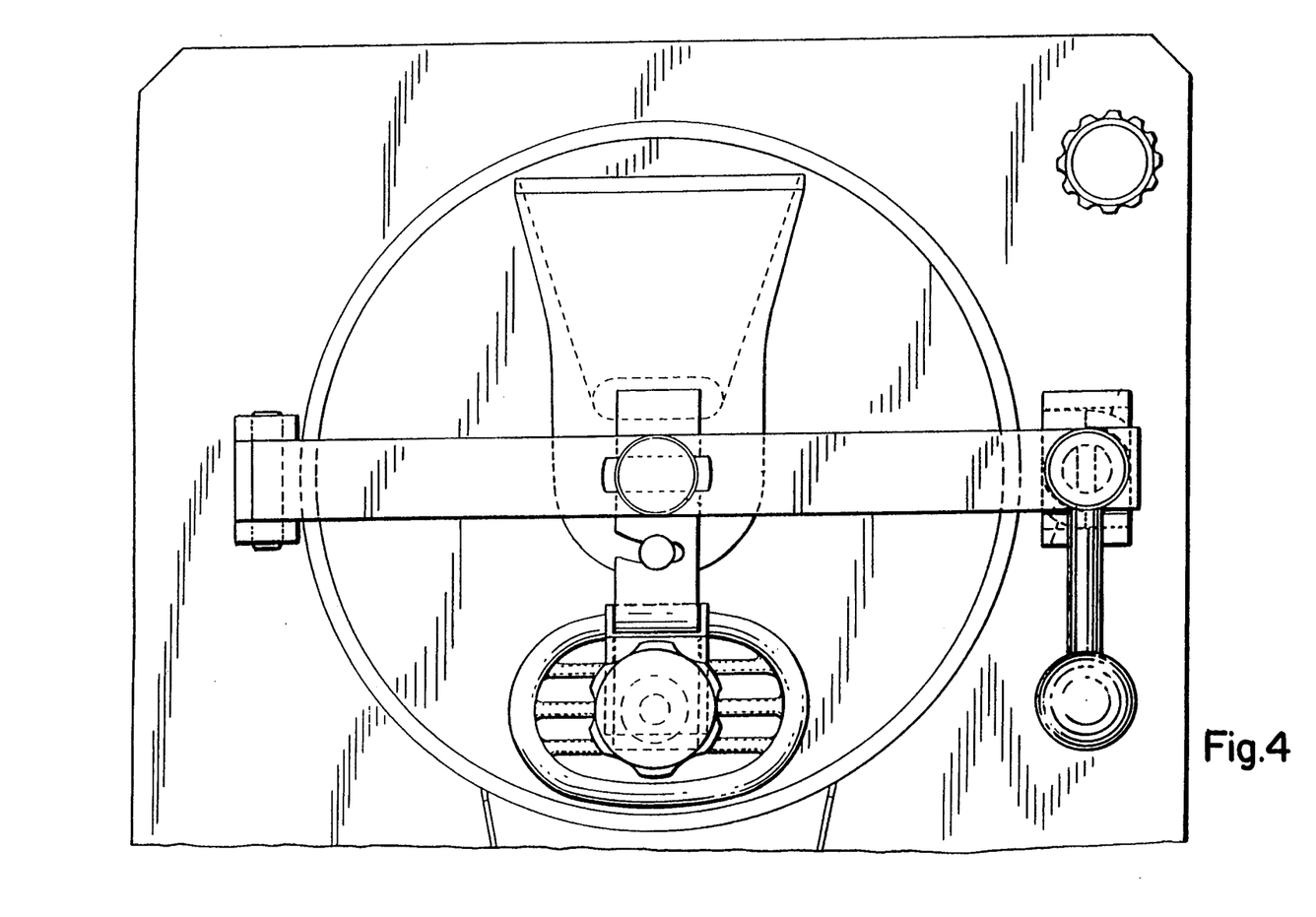
FIG. 4 is a front view of a door for the embodiment of FIG. 1.
Figure 5:
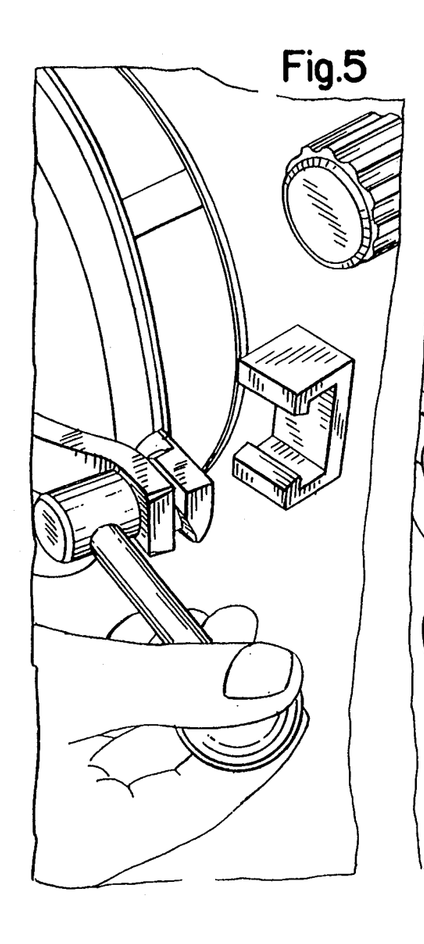
FIG. 5 is a perspective view of a door of FIG. 4 with the door unlatched and open.
Figure 6:
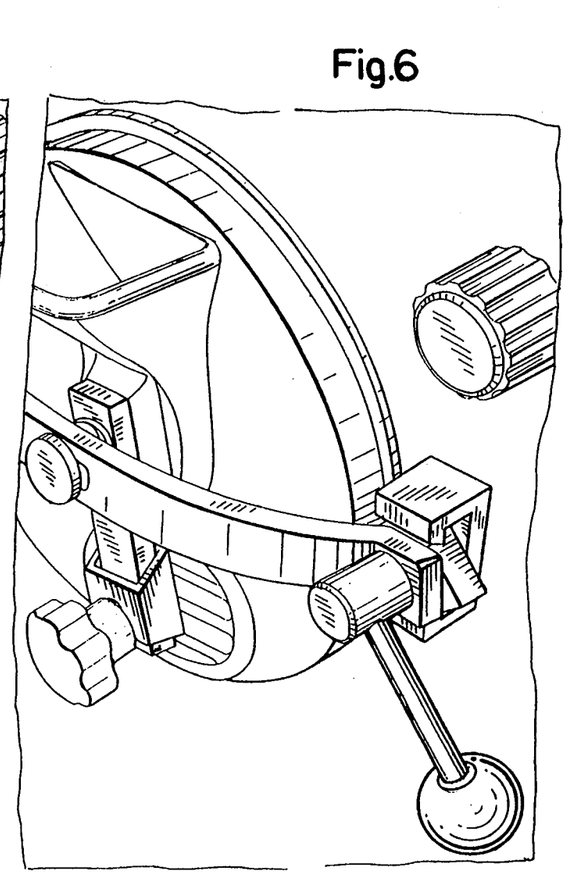
FIG. 6 is a perspective view of the latched door of FIG. 4.

FIG. 3 of the drawings shows a further possible embodiment of the invention in which the second motor 33 is operationally connected to the shaft 40 of the stirrer 21 and to the free wheel 35 via a reduction gear 45 instead of via the belt transmission 42.

The illustrated and described machine components can be of different type, the scope of the present invention being defined only by the following claims.

I claim:

1. A drive unit operating a machine for producing fluid like food products, said machine comprising two intercommunicating combined units, the first unit being a vertically arranged upper unit (12) and the second unit being a horizontally arranged lower unit (13), the upper unit (12) consisting of a container provided with cooling means and a stirrer (21) and the lower unit (13) consisting of a cylinder provided with cooling means and a mixer (26), said drive unit comprising:

a first motor (32) operatively connected to mixer (26) through a first reduction system (34) and a first shaft (36), said first reduction system (34) further connected to a second shaft (37) and a free wheel (35) having a hub (39), a second unit motor (33) operatively connected to said stirrer (21) through a second reduction system and a second shaft (40), said second reduction system further connected to said hub (39) thereby permitting an operative connection of said second motor (33) to said first reduction system (34) through said second shaft (37) upon the engagement of said free wheel (35), said drive unit being operable in a first mode of operation whereby said first motor (32) is not operated and said free wheel (35) is engaged to passively drag said first motor (32) by a rotation of said shaft (37) due to operation of said second motor (33) thereby to allow said second motor (33) to drive both said stirrer (21) and said mixer (26), and operable in a second mode of operation whereby said free wheel (35) is adapted to allow said first motor (32) to independently drive said mixer (26) and said second motor (33) to independently drive said stirrer (21).

2. A drive unit as claimed in claim 1, characterized in that the second reduction system consists of a cog belt transmission.

3. A drive unit as claimed in claim 1, characterized in that the second reduction system consists of a reduction gear unit mounted directly between said free wheel (35) and said stirrer (21).

4. A drive unit operating a machine for producing fluid like food products, said machine comprising two intercommunicating combined units, the first unit being a vertically arranged upper unit (12) and the second unit being a horizontally arranged lower unit (13), the upper unit (12) consisting of a container provided with cooling means and a stirrer (21) and the lower unit (13) consisting of a cylinder provided with heating means and a mixer (26), said drive unit comprising:

a first motor (32) operatively connected to mixer (26) through a first reduction system (34) and a first shaft (36), said first reduction system (34) further connected to a second shaft (37) and a free wheel (35) having a hub (39), a second unit motor (33) operatively connected to said stirrer (21) through a second reduction system and a second shaft (40), said second reduction system further connected to said hub (39) thereby permitting an operative connection of said second motor (33) to said first reduction system (34) through said second shaft (37) upon the engagement of said free wheel (35), said drive unit being operable in a first mode of operation whereby said first motor (32) is not operated and said free wheel (35) is engaged to passively drag said first motor (32) by a rotation of said shaft (37) due to operation of said second motor (33) thereby to allow said second motor (33) to drive both said stirrer (21) and said mixer (26), and operable in a second mode of operation whereby said free wheel (35) is adapted to allow said first motor (32) to independently drive said mixer (26) and said second motor (33) to independently drive said stirrer (21).

* * * * *